(12) United States Patent
Ishikawa et al.

(10) Patent No.: US 7,793,939 B2
(45) Date of Patent: Sep. 14, 2010

(54) SEALING STRUCTURE OF WHEEL SUPPORTING DEVICE

(75) Inventors: Tetsuya Ishikawa, Kashiwara (JP); Masaru Deguchi, Kashihara (JP); Youichi Tsuzaki, Kashiba (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 289 days.

(21) Appl. No.: 11/902,637

(22) Filed: Sep. 24, 2007

(65) Prior Publication Data

US 2008/0073854 A1 Mar. 27, 2008

(30) Foreign Application Priority Data

Sep. 25, 2006 (JP) ............................. 2006-259693
Jun. 26, 2007 (JP) ............................. 2007-167985

(51) Int. Cl.
*F16J 15/34* (2006.01)
*F16C 33/76* (2006.01)

(52) U.S. Cl. ...................... 277/353; 277/551; 277/572; 277/577; 384/484

(58) Field of Classification Search ................. 277/353, 277/551, 572, 575–577; 384/544, 589, 484, 384/485, 448
See application file for complete search history.

(56) References Cited

U.S. PATENT DOCUMENTS 3,457,732 A * 7/1969 Decouzon .................. 464/131
3,510,138 A * 5/1970 Bowen et al. ............... 277/571
4,427,202 A * 1/1984 Backlin ....................... 277/349
5,018,750 A * 5/1991 Sparks et al. ............... 277/353
5,813,675 A * 9/1998 Otto ........................... 277/549
6,050,570 A 4/2000 Otto
7,156,400 B2 * 1/2007 Oates ......................... 277/549
2003/0031393 A1 2/2003 Bellufi

FOREIGN PATENT DOCUMENTS

| DE | 10 2005 001 940 A1 | 8/2005 |
| EP | 1 096 185 A2 | 5/2001 |
| JP | 61-142964 | 9/1986 |
| JP | 7-174147 | 7/1995 |
| JP | 2003-21151 | 1/2003 |

* cited by examiner

*Primary Examiner*—Vishal Patel
(74) *Attorney, Agent, or Firm*—McGinn IP Law Group, PLLC (57) ABSTRACT

A seal cover includes a cylindrical part which is fixed to an outer peripheral surface of an axle, a flange part which is opposed to an end surface in an axial direction of a housing, interposing a small clearance, and a deflector part which is opposed to an outer peripheral surface of the housing, interposing a small clearance. A passage through which muddy water or the like arrives at an annular clearance from an exterior of a vehicle can be formed of the small clearances, and the passage can be made long. Because an overlapping amount between the deflector part and the outer peripheral surface of the housing can be secured, the muddy water or the like which has been splashed by a wheel and flowing from an outer peripheral side of the housing to an inner peripheral side can be made difficult to intrude into a space.

9 Claims, 7 Drawing Sheets

SEALING STRUCTURE OF WHEEL SUPPORTING DEVICE

BACKGROUND OF THE INVENTION

The present invention relates to a sealing structure of a wheel supporting device for preventing intrusion of muddy water or the like into a rolling bearing in the wheel supporting device.

Generally, the wheel supporting device which supports a wheel at a driven side of an automobile or the like includes an axle mounted on a vehicle body, and a housing in an annular shape to which the wheel is attached and which is rotatably held around the axle interposing a rolling bearing. In the wheel supporting device of this type, a sealing structure is provided for the purpose of preventing intrusion of strange obstacles such as muddy water, gravels, pebbles, into the rolling bearing, and breakdown of the rolling bearing. As an example of this sealing structure, such a structure that a seal member such as a pack seal is disposed in an annular clearance between an outer peripheral surface of the axle and an inner peripheral surface of the housing, outside the rolling bearing in an axial direction, as disclosed in JP-A-2003-21151, has been widely known.

Figure 9A:
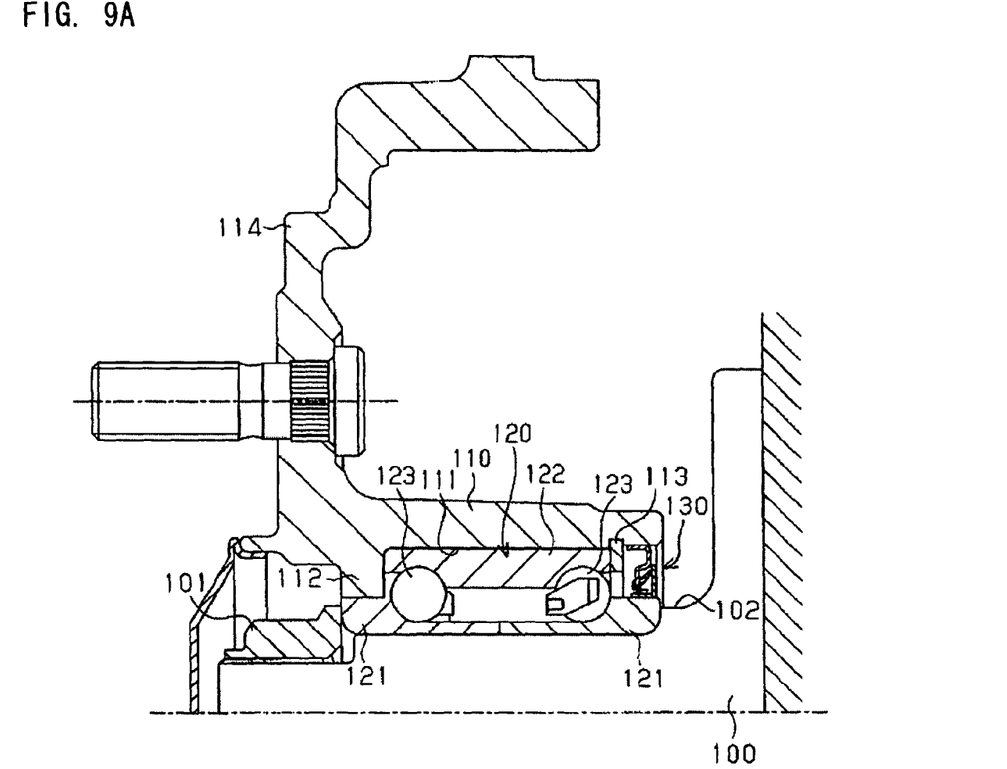
FIG. 9A is a longitudinal sectional view showing a structure of a wheel supporting device in a conventional case, and 9B is an enlarged sectional view of an essential part showing a sealing structure of this wheel supporting device.
Figure 9B:
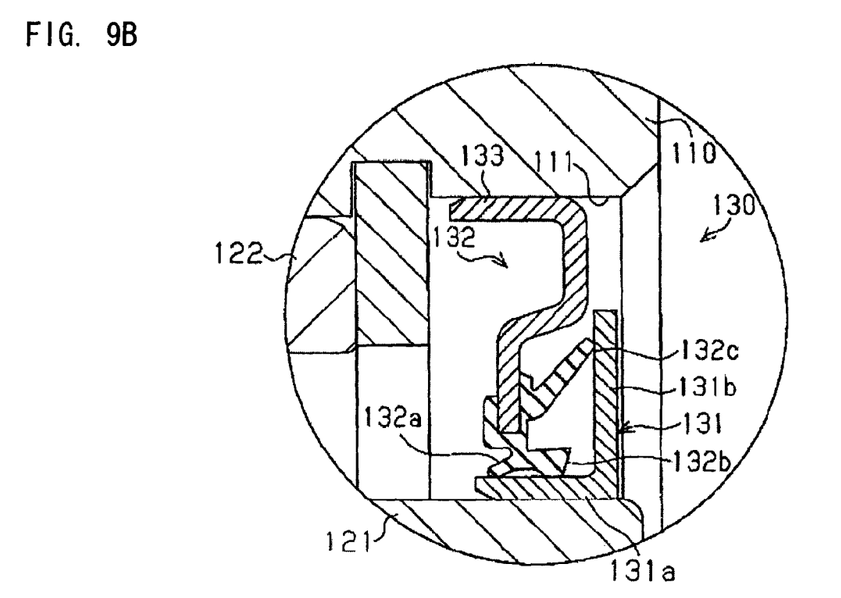

FIG. 9 is a longitudinal sectional view showing the sealing structure of the wheel supporting device as disclosed in JP-A-2003-21151. As shown in FIG. 9A, this wheel supporting device includes an axle 100 which is mounted on a vehicle body, a housing 110 to which a wheel is attached, and a rolling bearing 120 which supports the housing 110 so as to rotate with respect to the axle 100. A pair of inner rings 121 which are components of the rolling bearing 120 are fitted over an outer periphery of the axle 100. The inner rings 121 are clamped between a nut 101 which is screwed from an end part of the axle 100 and a shoulder part 102 which is formed at a base end of the axle 100, thereby to be fixed to the axle 100. An outer ring 122 which is a component of the rolling bearing 120 is fitted into a center bore 111 of the housing 110. The outer ring 122 is clamped between a rib part 112 which is formed in the center bore 111 and a snap ring 113 which is fitted into the center bore 111, thereby to be fixed to the housing 110. Moreover, the housing 110 is provided with a flange part 114 to which the wheel is adapted to be fit. The rolling bearing 120 is a double row angular ball bearing, and includes balls 123 which are arranged in double rows between a raceway surface formed on outer peripheral surfaces of the inner rings 121 and a raceway surface formed on an inner peripheral surface of the outer ring 122.

In addition, a pack seal 130 is provided in an annular clearance between the outer peripheral surface of the axle 100 and the inner peripheral surface of the housing 110, at an inner side of the rolling bearing 120 (an opposite side to the side where the wheel is attached), so that intrusion of muddy water or the like from the exterior may be prevented. As shown in FIG. 9B, the pack seal 130 includes a slinger 131 which is fitted to the outer peripheries of the inner rings 121, and a seal member 132 which is fitted to an inner periphery of the center bore 111 of the housing 110. The slinger 131 is formed in an L-shape in cross section having a cylindrical part 131a, and a flange part 131b which extends radially outward from this cylindrical part 131a. The seal member 132 has radial lips 132a and 132b in a bifurcated shape which are in sliding contact with the cylindrical part 131a of the slinger 131, and a side lip 132c which is in sliding contact with the flange part 131b of the slinger 131. The seal member 132 is formed by bonding the radial lips 132a, 132b and the side lip 132c integrally to a core wire 133 by vulcanized boding of rubber.

In this manner, by providing the pack seal 130 at the inner side of the rolling bearing 120, the sealing structure is formed so that intrusion of muddy water or the like from the exterior may be prevented, and damage of the rolling bearing by the intrusion of the muddy water or the like may be restrained.

By the way, in the wheel supporting device as disclosed in No. JP-A-2003-21151, it is sometimes difficult to reliably prevent intrusion of the muddy water or the like into the rolling bearing, because the sealing structure at the inner side of the rolling bearing depends only on the pack seal. Specifically, because there is no other sealing structure in a region from the exterior of the vehicle to the pack seal, it would be probable that a large amount of muddy water or the like may be delivered to the pack seal. In case where a large amount of the muddy water or the like has been delivered, it becomes difficult to reliably exclude the muddy water or the like only by sealing function of the pack seal, and there is such anxiety that a large amount of the muddy water or the like may intrude into the rolling bearing.

SUMMARY OF THE INVENTION

The invention has been made in view of the above described circumstances, and it is an object of the invention to provide a sealing structure of a wheel supporting device which can restrain muddy water or the like from intruding into a rolling bearing.

In order to attain the above described object, the present invention provides the following arrangement.

(1) A sealing structure for a wheel supporting device that includes an axle mounted on a vehicle body and an annular housing which is rotatably supported by the axle through a rolling bearing and to which a wheel is attached, the sealing structure comprising:

a seal cover disposed in an annular clearance between an outer peripheral surface of the axle and an inner peripheral surface of the housing outside the rolling bearing in an axial direction, wherein the seal cover includes:

a cylindrical part which is fixed to the outer peripheral surface of the axle;

an annular flange part which is formed so as to extend outward in a radial direction from an end part of the cylindrical part in the axial direction and opposed to an end surface of the housing in the axial direction; and a cylindrical deflector part which is formed so as to extend in the axial direction from an outer peripheral edge of the flange part and opposed to an outer peripheral surface of the housing.

(2) The sealing structure according to (1), wherein a seal rubber in an annular shape is fixed to a corner part between the cylindrical part and the flange part of the seal cover, and the seal rubber includes a cylindrical part which is opposed in the radial direction to a space between the end surface of the housing in the axial direction and the flange part and a recess formed on a surface of the cylindrical part of the seal rubber along an entire circumference thereof.

(3) The sealing structure according to (2) further comprising a slinger having a cylindrical part fixed to the inner peripheral surface of the housing which is opposed to the cylindrical part of the seal cover, and a flange part which is formed so as to extend inward in the radial direction from an end part of the cylindrical part in the axial direction and opposed to the flange part of the seal cover in the axial direction, and the seal rubber includes a lip part which is in sliding contact with the flange part of the slinger.

(4) A sealing structure for a wheel supporting device comprising:
- an axle mounted on a vehicle body;
- a housing in an annular shape to which a wheel is attached;
- a rolling bearing which includes a cylindrical inner ring and a cylindrical outer ring, the inner ring being fixed to an outer peripheral part of the axle, the outer ring being fixed to the housing; and
- a seal cover disposed in an annular clearance between an outer peripheral surface of an end part of the inner ring at a vehicle body side in an axial direction and an inner peripheral surface of the housing,
  wherein the seal cover includes:
  - a cylindrical part which is fixed to the outer peripheral surface of the inner ring;
  - an annular flange part which is formed so as to extend outward in a radial direction from an end part of the cylindrical part in the axial direction and opposed to an end surface of the housing in the axial direction; and
  - a cylindrical deflector part which is formed so as to extend in the axial direction from an outer peripheral edge of the flange part and opposed to an outer peripheral surface of the housing.

(5) The sealing structure according to (4), wherein
a seal rubber in an annular shape is fixed to a corner part between the cylindrical part and the flange part of the seal cover, and
the seal rubber includes a cylindrical part which is opposed in the radial direction to a space between the end surface of the housing in the axial direction and the flange part and a recess formed on a surface of the cylindrical part of the seal rubber along an entire circumference thereof.

(6) The sealing structure according to (5) further comprising
a slinger having a cylindrical part fixed to the inner peripheral surface of the housing which is opposed to the cylindrical part of the seal cover, and a flange part which is formed so as to extend inward in the radial direction from an end part of the cylindrical part in the axial direction and opposed to the flange part of the seal cover in the axial direction, and
the seal rubber includes a lip part which is in sliding contact with the flange part of the slinger.

According to the invention, the cylindrical part of the seal cover is fixed to the outer peripheral surface of the axle, the flange part of the seal cover is opposed to the end surface in the axial direction of the housing, and the deflector part is opposed to the outer peripheral surface of the housing. Therefore, a passage through which the muddy water or the like arrives at the annular clearance between the outer peripheral surface of the axle and the inner peripheral surface of the housing, outside the rolling bearing in the axial direction, can be made long. Moreover, because the deflector part is opposed to the outer peripheral surface of the housing, an overlapping amount in the axial direction between the deflector part and the outer peripheral surface of the housing can be secured, and hence, it is possible to favorably restrain the muddy water or the like which has been splashed by the wheel and directed to the inner peripheral side of the housing from the outer peripheral side thereof from intruding into the passage. For this reason, it is possible with this sealing structure to restrain the muddy water or the like from intruding into the annular clearance, and from arriving at the interior of the rolling bearing. As the results, breakdown of the rolling bearing by the intrusion of the muddy water or the like can be restrained to the least.

According to the invention, the cylindrical part of the seal cover is fixed to the outer peripheral surface of the end part at the vehicle body side in the axial direction of the inner ring of the rolling bearing, the flange part is opposed to the end surface in the axial direction of the housing, and the deflector part is opposed to the outer peripheral surface of the housing. Therefore, a passage through which the muddy water or the like arrives at the annular clearance between the outer peripheral surface of the end part at the vehicle body side in the axial direction of the inner ring of the rolling bearing and the inner peripheral surface of the housing can be made long. Moreover, because the deflector part is opposed to the outer peripheral surface of the housing, an overlapping amount in the axial direction between the deflector part and the outer peripheral surface of the housing can be secured, and hence, it is possible to favorably restrain the muddy water or the like which has been splashed by the wheel and directed to the inner peripheral side of the housing from the outer peripheral side thereof from intruding into the passage. For this reason, it is possible with this sealing structure to restrain the muddy water or the like from intruding into the annular clearance, and from arriving at the interior of the rolling bearing. As the results, damage of the rolling bearing by the intrusion of the muddy water or the like can be restrained to the least.

Moreover, the seal cover provided in this invention is fixed to the outer peripheral surface of the end part at the vehicle body side in the axial direction of the inner ring of the rolling bearing, by means of the cylindrical part thereof. In short, the seal cover is an additive structure which belongs to the rolling bearing. Therefore, the seal cover can be molded at the same time when the rolling bearing is produced. Moreover, when the seal cover is attached to the axle, no particular step is required, but it is possible to attach the seal cover at the same time, by mounting the rolling bearing to the axle.

According to the invention, the seal rubber which is fixed to the seal cover is provided with the recess along the entire circumference on the surface of its cylindrical part which is opposed in the radial direction to the space between the end surface in the axial direction of the housing and the flange part. Therefore, the muddy water or the like intruding from the space can be discharged by trough effect. Specifically, the muddy water or the like which has intruded from the exterior flows downward along the recess without staying there, when the vehicle stops, and is discharged to the exterior through the space. Further, because the muddy water or the like intruding into the space inwardly in the radial direction cannot be easily directed to the axial direction, the muddy water or the like can be restrained from being introduced to the rolling bearing side.

According to the invention, the cylindrical part of the slinger is fixed to the inner peripheral surface of the housing, and the flange part is formed so as to extend inward in the radial direction. In addition, the lip part of the seal rubber is so designed as to come into sliding contact with the flange part of the slinger. Therefore, intrusion of the muddy water or the like can be further restrained by this lip part. Moreover, because the lip part is in sliding contact with the slinger which is separately provided, it is possible to construct the sealing structure in such a manner that sliding load generated with the rotation of the housing can be reduced to the least, while sealing performance of the sliding part is maintained.

Moreover, by securing the distance in the axial direction between the flange part of the slinger with which the lip part is in sliding contact and the end surface in the axial direction of the housing, that is, an overlapping amount in the axial direction between the inner peripheral surface of the housing and the seal rubber, the muddy water or the like coming through the space inwardly in the radial direction can be made difficult to be introduced to the axial direction. As the results, it is possible to more favorably restrain the muddy water or the like from intruding to the rolling bearing side.

According to this invention, the sealing structure of the wheel supporting device includes the seal cover which has the cylindrical part, the flange part and the deflector part. Therefore, the passage through which the muddy water or the like arrives at the annular clearance which is formed between the outer peripheral surface of the axle and the inner peripheral surface of the housing, outside the rolling bearing in the axial direction, can be made long. Moreover, because the overlapping amount in the axial direction between the deflector part and the outer peripheral surface of the housing can be secured, it is possible to favorably restrain the muddy water or the like which has been splashed by the wheel and directed to the inner peripheral side of the housing from the outer peripheral side thereof from intruding into the passage. For this reason, it is possible with this sealing structure to restrain the muddy water or the like from intruding into the annular clearance, and hence, it is possible to restrain the muddy water or the like from arriving at the interior of the rolling bearing.

DESCRIPTION OF PREFERRED EMBODIMENTS

First Embodiment

Figure 1:
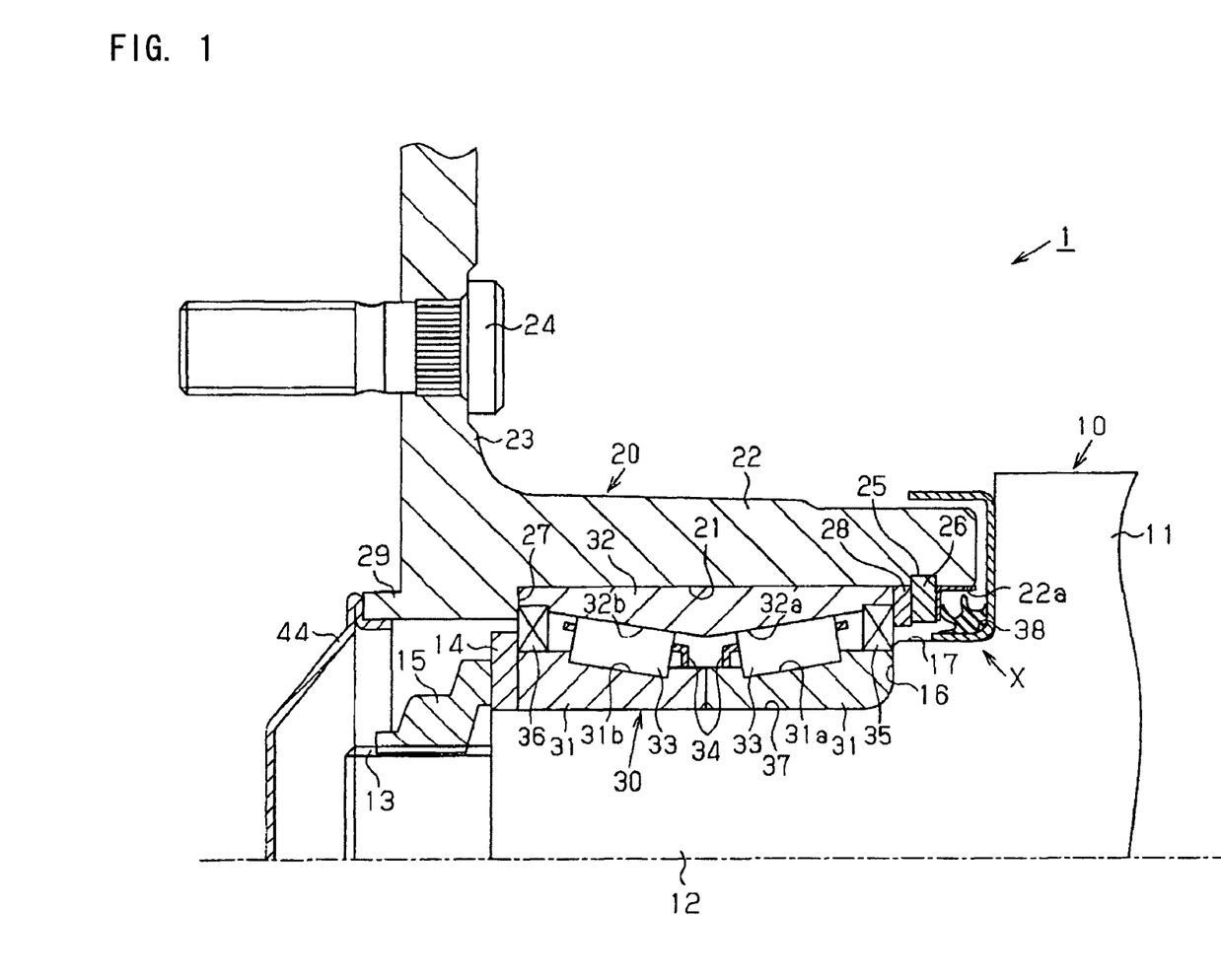
FIG. 1 is a longitudinal sectional view showing a structure of a wheel supporting device according to a first embodiment.
Figure 2:
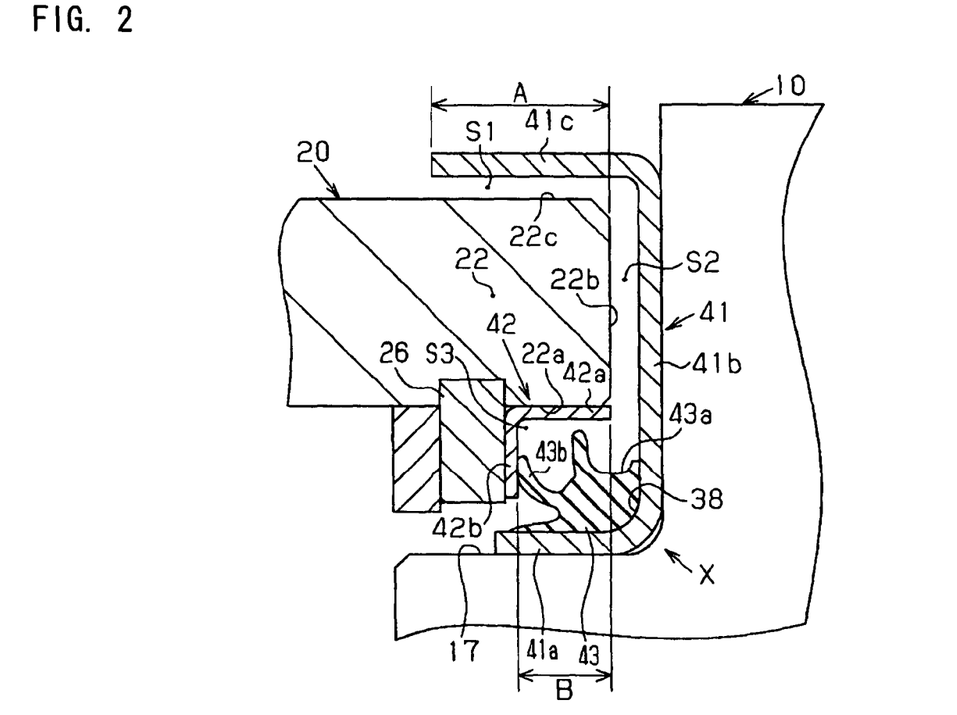
FIG. 2 is an enlarged sectional view showing a sealing structure of the wheel supporting device according to the first embodiment.

Now, referring to FIGS. 1 and 2, a sealing structure for a wheel supporting device according to an embodiment of the invention will be described. FIG. 1 is a longitudinal sectional view showing a structure of a wheel supporting device 1. This wheel supporting device 1 supports a wheel at a driven side of an automobile or the like, and includes an axle 10 mounted on a vehicle body, a housing 20 to which the wheel is attached, and a rolling bearing 30 which supports the housing 20 so as to rotate with respect to the axle 10. It is to be noted that the side where the wheel is attached is called as an outer side, while the opposite side is called as an inner side.

The axle 10 has a large diameter part 11 at the inner side, and a small diameter part 12 at the outer side. The large diameter part 11 is fixed at its inner side to the vehicle body by means of a mounting part which is not shown. A pair of inner rings 31 which are components of the rolling bearing 30 are fitted over an outer periphery of the small diameter part 12. A threaded part 13 is formed on an outer side end of the small diameter part 12, and a nut 15 is spirally engaged with this threaded part 13 interposing a spacer 14. By spirally engaging the nut 15, the inner rings 31 are clamped between an inner side end surface 16 of a stepped part which is formed at the outer side of the small diameter part 12 and the spacer 14, thereby to be fixed to an outer peripheral part 37 of the axle 10.

The housing 20 has a flange part 23 to which the wheel (not shown) is attached, at an outer side end of a shaft part 22 which is formed with a center bore 21. Hub bolts 24 for securing the wheel are provided in this flange part 23 at circumferentially equal intervals. Moreover, a braking mechanism (not shown) for applying a braking force against rotation of the housing 20 is arranged at an outer peripheral side of the shaft part 22.

An outer ring 32 which is a component of the rolling bearing 30 is fitted to an inner periphery of the center bore 21 of the housing 20. A groove 25 is formed on the inner periphery of the center bore 21 at the inner side, and a snap ring 26 is fitted into this groove 25. By fitting this snap ring 26, the outer ring 32 is clamped between an inner side end surface 27 of a stepped part which is formed in the center bore 21 and a spacer 28 in an annular shape which is inserted at the outer side of the snap ring 26 thereby to be fixed to the housing 20.

The rolling bearing 30 is a double row taper roller bearing, and has a pair of the inner rings 31 which are arranged at the outer side and at the inner side, the outer ring 32, taper rollers 33 in double rows, cages 34, and seal members 35, 36 which are arranged at the inner side and at the outer side. A pair of the inner rings 31 have respective raceway surfaces 31a, 31b for the taper rollers 33, on outer peripheral surfaces thereof. The outer ring 32 has raceway surfaces 32a, 32b at positions opposed to a pair of the raceway surfaces 31a, 31b. The taper rollers 33 are respectively arranged between the raceway surfaces 31a, 31b and the raceway surfaces 32a, 32b. The cages 34 are disposed in a space which is formed between the outer peripheral surfaces of the inner rings 31 and the inner peripheral surface of the outer ring 32, and hold the taper rollers 33 so as to rotate. The seal members 35, 36 which are formed of a known pack seal or the like are interposed between both ends of the inner rings 31 and both ends of the outer ring 32. The seal members 35, 36 restrain muddy water or the like from intruding into the roller bearing 30 through a gap between the inner rings 31 and the outer ring 32, and restrains lubricating grease which is sealed inside the rolling bearing 30 from scattering to the exterior.

Now, a sealing structure in an annular clearance X between an outer peripheral surface 17 of the axle 10 and an inner peripheral surface 22a of the shaft part 22 of the housing 20 at the inner side of the rolling bearing 30 will be described. FIG. 2 is an enlarged sectional view of an essential part showing the sealing structure in the annular clearance X. This sealing structure includes a seal cover 41, a slinger 42, and a seal rubber 43.

The seal cover 41 is formed in a C-shape in cross section having a cylindrical part 41a, a flange part 41b, and a deflector part 41c. The cylindrical part 41a is fixed to the outer peripheral surface 17 of the axle 10 by press-fitting. The flange part 41b is formed in annular shape so as to extend outward in a radial direction from an inner side end of the cylindrical part 41a, and opposed to an end surface 22b of the shaft part 22 of the housing 20 in an axial direction, interposing a small clearance. The deflector part 41c is formed in a cylindrical shape so as to extend in the axial direction from an outer peripheral edge of the flange part 41b, and opposed to an outer peripheral surface 22c of the shaft part 22 of the housing 20, interposing a small clearance.

The slinger 42 is formed in an L-shape in cross section having a cylindrical part 42a and a flange part 42b. The cylindrical part 42a is fixed to the inner peripheral surface 22a of the shaft part 22 of the housing 20 by press-fitting. The flange part 42b is formed so as to extend inward in a radial direction from an outer side end of the cylindrical part 42a, and opposed to the flange part 41b of the seal cover 41 in the axial direction.

The seal rubber 43 in an annular shape is disposed in the annular clearance X, and fixed to a corner part 38 between inner surfaces of the cylindrical part 41a and the flange part 41b of the seal cover 41 by vulcanized bonding. The seal rubber 43 has a recess 43a and a lip part 43b. The recess 43a is formed along an entire circumference on a surface of a cylindrical part of the seal rubber 43 which is opposed in the radial direction to a space S2 between the end surface 22b of the shaft part 22 of the housing 20 in the axial direction and the flange part 41b of the seal cover 41. The lip part 43b is formed so as to extend to the outer side and to an inner peripheral side, and a tip end of the lip part 43b is in sliding contact with the flange part 42b of the slinger 42.

Then, function of the sealing structure having the above described structure will be described. While the vehicle is running, muddy water or the like is splashed by the wheel and soon, and intrudes from the outer peripheral side of the housing 20 to the inner peripheral side. On this occasion, because a large overlapping amount A in the axial direction is secured between the deflector part 41c of the seal cover 41 and the outer peripheral surface 22c of the shaft part 22 of the housing 20, the muddy water or the like hardly intrudes into a space S1 between the outer peripheral surface 22c and the deflector part 41c. In case where the muddy water or the like has intruded into the space S1, the muddy water or the like must pass a long passage of small clearances such as the space S1 and the space S2, until it arrives at the annular clearance X, and hence, it is difficult for the muddy water or the like from the exterior to arrive at the annular clearance X.

Then, the muddy water or the like which has arrived at the annular clearance X through the space S2 is introduced to the recess 43a of the seal rubber 43 which is formed so as to be opposed to the space S2. Because this recess 43a is formed along the entire circumference of the seal rubber 43, the muddy water or the like introduced to the recess 43a is discharged by trough effect. Specifically, the muddy water or the like in the recess 43a flows downward along the recess 43a without staying there, and is discharged to the exterior through the space S2 and the space S1. Moreover, the muddy water or the like introduced to the recess 43a is hindered by a wall of the recess 43a at the outer side, and becomes difficult to move toward a space S3 which is formed at the outer peripheral side of the lip part 43b of the seal rubber 43. Further, because an overlapping amount B in the axial direction is secured between the inner peripheral surface 22a of the shaft part 22 of the housing 20 and the seal rubber 43, the muddy water or the like intruding through the space S2 inwardly in the radial direction becomes difficult to be introduced into the space S3 which is formed at the outer side.

In addition, because the lip part 43b of the seal rubber 43 is in sliding contact with the flange part 42b of the slinger 42, the muddy water or the like which intrudes to a side of the rolling bearing 30 from the space S3 can be substantially eliminated. Moreover, because the seal member 35 is disposed at the inner side end of the rolling bearing 30, intrusion of the muddy water or the like into the rolling bearing 30 is further restrained.

As described above, an amount of the muddy water introduced to the side of the rolling bearing 30 is sequentially decreased by respective constituent elements of the sealing structure and the seal member 35, it is possible to substantially eliminate the muddy water or the like which is introduced from the exterior of the vehicle into the rolling bearing 30. As the results, breakdown of the rolling bearing 30 by the intrusion of the muddy water or the like can be prevented.

In addition, the intrusion of the muddy water or the like from the outer side of the rolling bearing 30 is restrained by fitting an end cap 44 to a spigot joint part 29 which is formed at the outer side of the housing 20. Moreover, the intrusion of the muddy water or the like is further restrained by the seal member 36 which is arranged at the outer side end of the rolling bearing 30.

According to the sealing structure of the wheel supporting device in the above described embodiment, the following advantages can be obtained.

(1) In the above described embodiment, the flange part 41b of the seal cover 41 is opposed to the end surface 22b of the housing 20 in the axial direction, interposing the small clearance, and the deflector part 41c is opposed to the outer peripheral surface 22c of the housing 20, interposing the small clearance. Therefore, the passage through which the muddy water or the like arrives at the annular clearance X from the exterior of the vehicle can be formed of the small clearances, and the passage can be made long. Moreover, the overlapping amount A between the deflector part 41c and the outer peripheral surface 22c of the housing 20 can be secured, and hence, the muddy water or the like which has been splashed by the wheel and directed to the inner peripheral side of the housing 20 from the outer peripheral side thereof becomes difficult to intrude into the space S1. For this reason, it is possible to restrain the muddy water or the like from intruding into the gap X, and from arriving at the interior of the rolling bearing 30. As the results, breakdown of the rolling bearing 30 by the intrusion of the muddy water or the like can be restrained.

(2) In the above described embodiment, because the seal rubber 43 is provided with the recess 43a along the entire circumference on the surface of its cylindrical part which is opposed to the space S2 in the radial direction, the muddy water or the like intruding from the space S2 can be discharged by the trough effect. Moreover, because the muddy water or the like which has been introduced to the recess 43a is hindered by the wall of the recess 43a of the seal rubber 43 at the outer side and cannot easily move to the space S3 which is formed at the outer peripheral side of the lip part 43b of the seal rubber 43, it is possible to restrain the muddy water or the like from being introduced to the side of the rolling bearing 30.

(3) In the above described embodiment, by securing the distance in the axial direction between the flange part 42b of the slinger 42 and the end surface 22b of the housing 20 in the axial direction, that is, the overlapping amount B between the inner peripheral surface 22a of the housing 20 and the seal rubber 43, it is possible to make the muddy water or the like coming through the space S2 radially inwardly difficult to be introduced into the space S3 which is positioned at the outer side. As the results, intrusion of the muddy water or the like to the side of the rolling bearing 30 can be favorably restrained.

(4) In the above described embodiment, because the lip part 43b of the seal rubber 43 is so designed as to come into sliding contact with the flange part 42b of the slinger 42, the muddy water or the like intruding into the side of the rolling bearing 30 from the space S3 can be substantially eliminated. Moreover, because the lip part 43b is in sliding contact with the slinger 42, it is possible to take such a structure that sliding load generated with the rotation of the housing 20 can be reduced to the least, while sealing performance of the sliding part is maintained.

Figure 3:
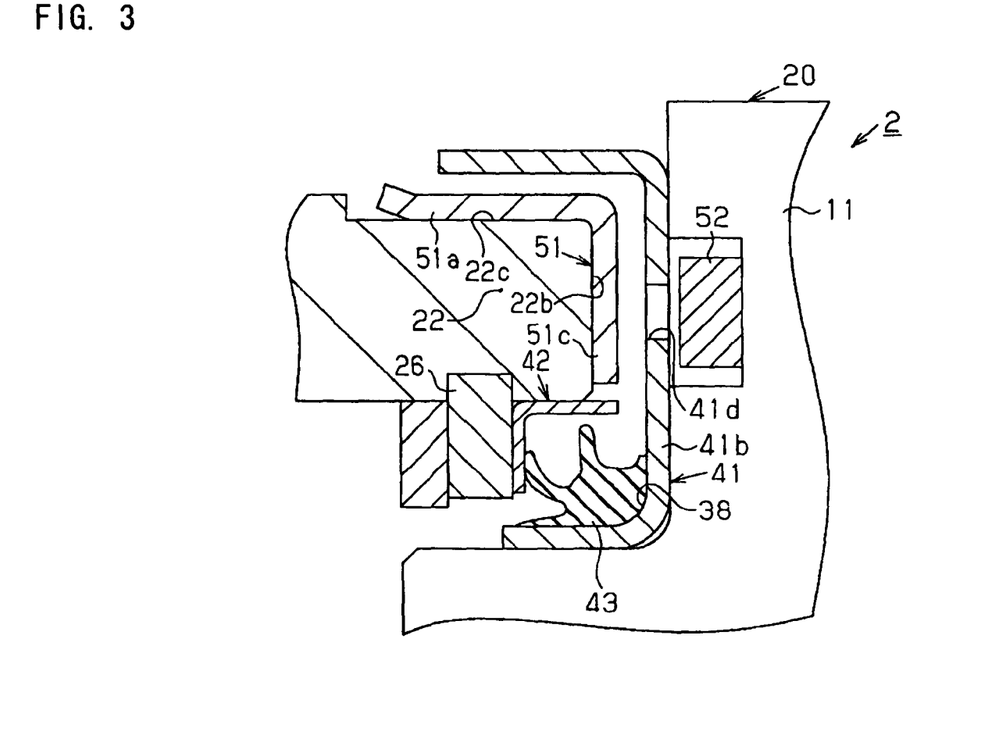
FIG. 3 is an enlarged sectional view showing a sealing structure of the wheel supporting device in another example according to the first embodiment.

The above described embodiment may be modified as follows;

The sealing structure in the above described embodiment can be also applied to such a wheel supporting device that a magnetized member is attached to the end surface of the housing in the axial direction, and rotation speed of the housing can be detected by detecting magnetic poles of the magnetized member by means of a magnetic sensor. FIG. 3 is an enlarged sectional view of an essential part of a sealing structure of a wheel supporting device 2 which is constructed in this manner. It is to be noted that the same components as in the above described embodiment are denoted with the same reference numerals. The shaft part 22 of the housing 20 is provided with a pulsar ring 51 as the magnetized member. The pulsar ring 51 has a cylindrical part 51a which is fixed to the outer peripheral surface 22c of the shaft part 22 by press-fitting, and a magnetized part 51c in an annular shape which is arranged on the end surface 22b of the housing 20 in the axial direction and magnetized with multi-polarity in a circumferential direction. The sealing structure including the seal cover 41, the slinger 42, and the seal rubber 43 is constructed in the same manner as in the above described embodiment. The large diameter part 11 of the axle 10 is provided with a magnetic sensor 52 at the outer side, which detects the magnetic poles of the magnetized part 51c through a hole 41d which is formed in the flange part 41b of the seal cover 41. In the wheel supporting device 2 which is constructed in this manner, it is possible to employ the same sealing structure as in the wheel supporting device 1, and hence, the muddy water or the like can be restrained from intruding to the rolling bearing side.

Figure 4:
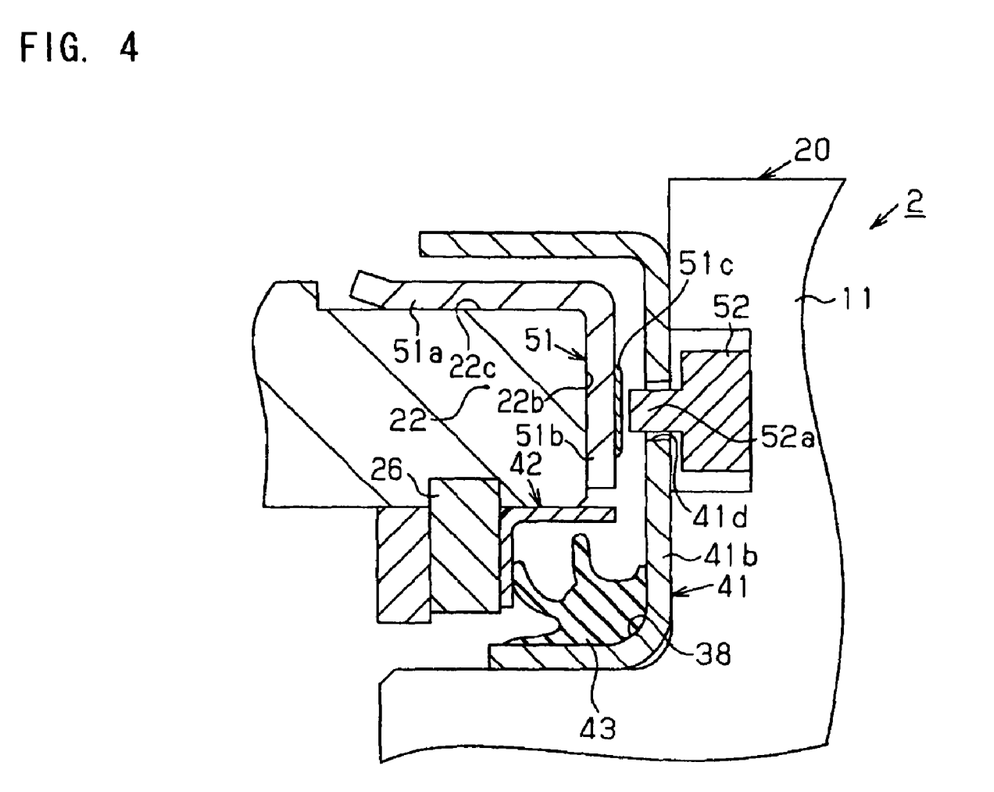
FIG. 4 is an enlarged sectional view showing a sealing structure of the wheel supporting device in still another example according to the first embodiment.

The sealing structure in the above described embodiment can be also applied to such a wheel supporting device that a magnetized member is attached to the end surface of the housing in the axial direction, and the rotation speed of the housing can be detected by detecting magnetic poles of the magnetized member by means of a magnetic sensor. FIG. 4 is an enlarged sectional view of an essential part of a sealing structure of a wheel supporting device 2 which is constructed in this manner. It is to be noted that the same components as in the above described embodiment are denoted with the same reference numerals. The shaft part 22 of the housing 20 is provided with a pulsar ring 51 as the magnetized member. The pulsar ring 51 has a cylindrical part 51a which is fixed to the outer peripheral surface 22c of the shaft part 22 by press-fitting, a magnetized part supporting part 51b in an annular shape which is arranged on the end surface 22b of the shaft part 22 in the axial direction, and a magnetized part 51c in an annular shape which is attached to the magnetized part supporting part 51b and magnetized with multi-polarity in a circumferential direction. The magnetized part 51c is molded of rubber or synthetic resin into an annular shape, after magnetic powder such as ferrite has been mixed into the rubber or the synthetic resin, and magnetized with positive poles and negative poles alternately in a circumferential direction. The sealing structure including the seal cover 41, the slinger 42, and the seal rubber 43 is constructed in the same manner as in the above described embodiment. The large diameter part 11 of the axle 10 is provided with the magnetic sensor 52 at the outer side. A detecting part 52a of the magnetic sensor 52 is projected toward the magnetized part 51c through a hole 41d which is formed in the flange part 41b of the seal cover 41 and detects the magnetic poles of the magnetized part 51c. In the wheel supporting device 2 which is constructed in this manner, it is possible to employ the same sealing structure as in the wheel supporting device 1, and hence, the muddy water or the like can be restrained from intruding to the rolling bearing side. Moreover, according to this structure, because the detecting part 52a of the magnetic sensor 52 is positioned close to the magnetized part 51c, detecting sensitivity of the magnetic sensor 52 can be made lower, and hence, a compact or a low-price magnetic sensor can be used.

In the above described embodiment, the lip part 43b of the seal rubber 43 is so designed as to be in sliding contact with the flange part 42b of the slinger 42. However, the lip part 43a may be so designed as to be in sliding contact with the surface of the housing 20 or the snap ring 26, without providing the slinger 42. Alternatively, the seal rubber 43 may be provided with a plurality of lip parts which are in sliding contact with the slinger.

In the above described embodiment, the seal member 35 is arranged on the inner side end of the rolling bearing 30. However, the seal member 35 may be omitted, provided that intrusion of the muddy water or the like into the rolling bearing 30 can be sufficiently restrained by the above described sealing structure.

In the above described embodiment, the inner ring 31 includes two inner ring members. However, it is possible to employ such a structure that the inner ring at the inner side is formed integrally with the axle 10.

In the above described embodiment, the double row taper roller bearing is used as the rolling bearing 30. However, a double row angular ball bearing may be also used.

Second Embodiment

Figure 5:
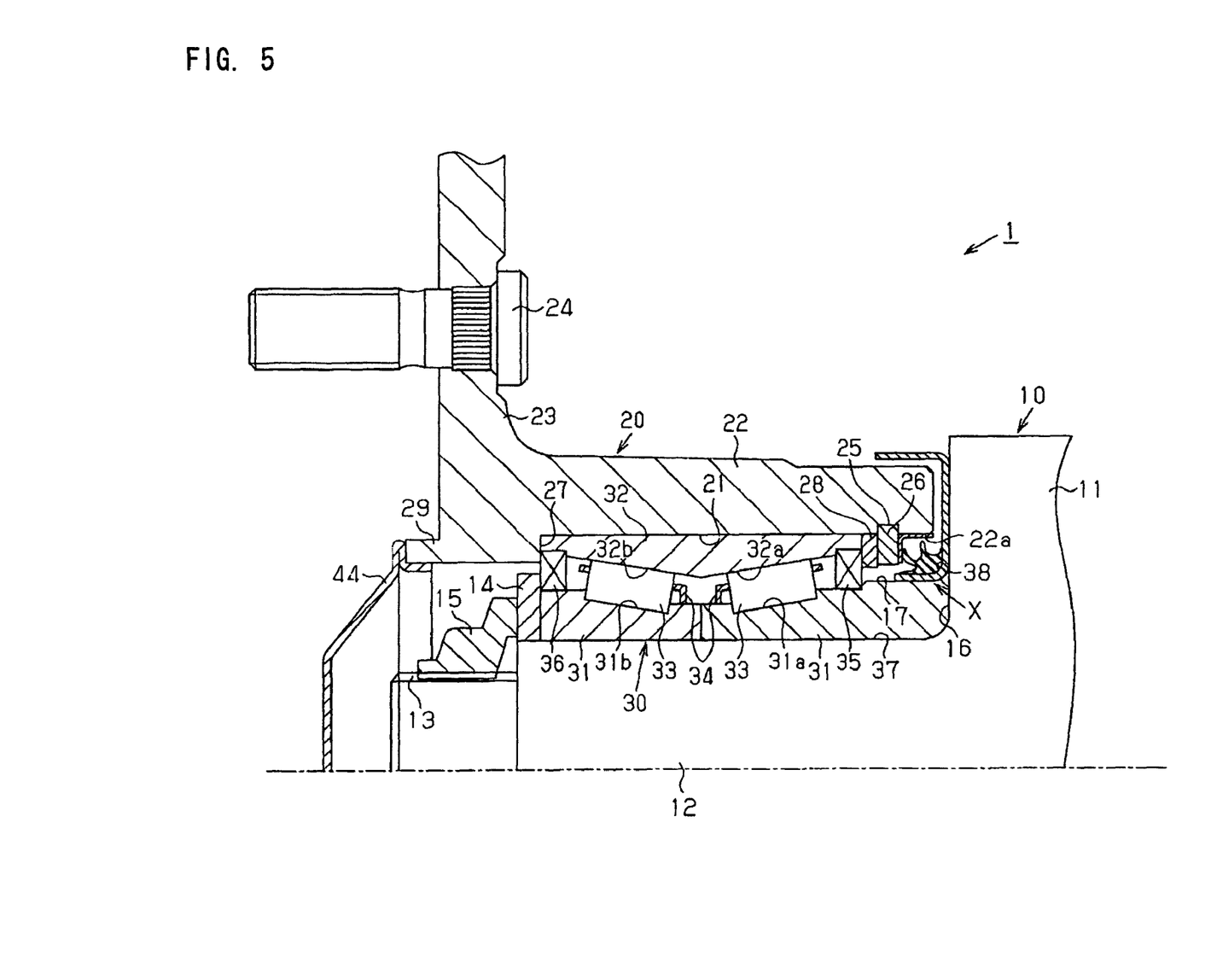
FIG. 5 is a longitudinal sectional view showing a structure of a wheel supporting device according to a second embodiment.
Figure 6:
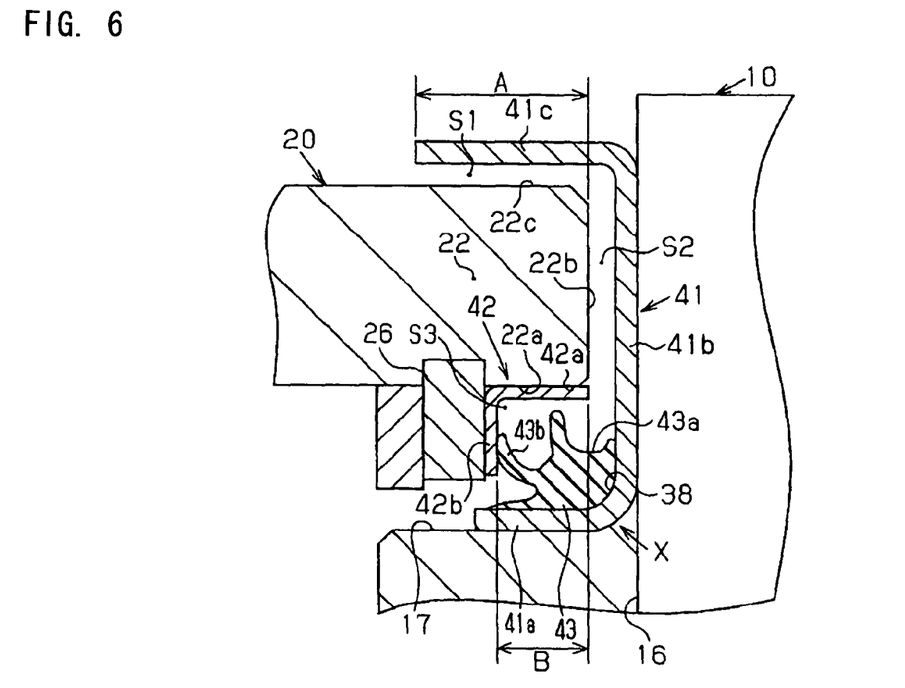
FIG. 6 is an enlarged sectional view showing a sealing structure of the wheel supporting device according to the second embodiment.
Figure 7:
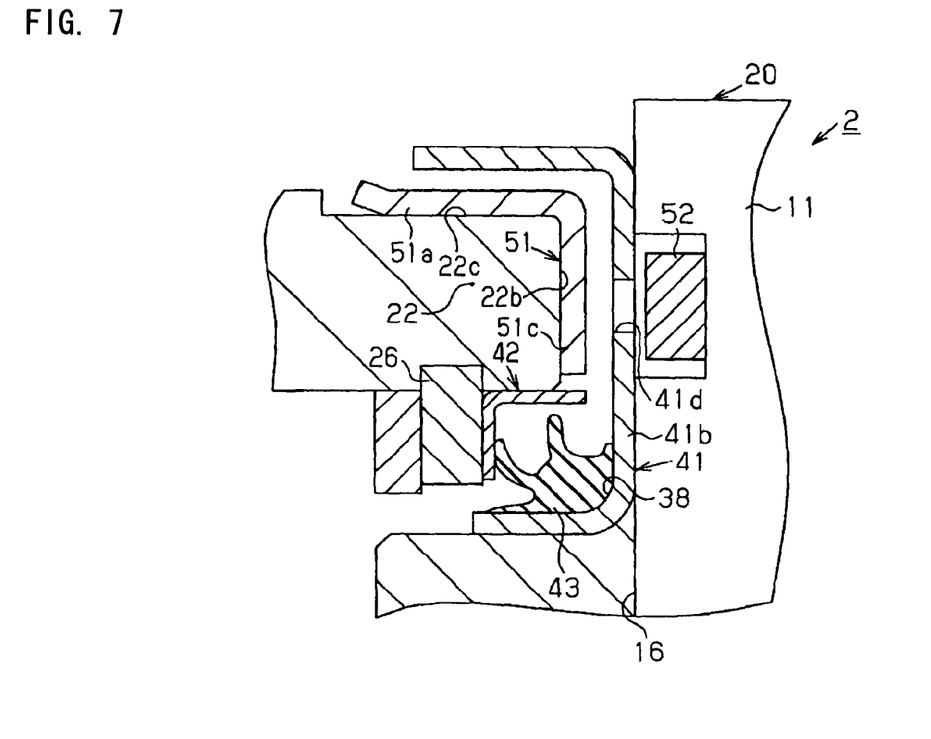
FIG. 7 is an enlarged sectional view showing a sealing structure of the wheel supporting device in another example according to the second embodiment.

Then, a second embodiment which embodies the sealing structure of the wheel supporting device according to the invention will be described referring to FIGS. 5 to 7. It is to be noted that the second embodiment is different from the first embodiment in that a length in the axial direction of the inner rings 31 at the inner side is changed. Moreover, the substantially same components are denoted with the same reference numerals.

Now, referring to FIGS. 5 and 6, the second embodiment which embodies the sealing structure for the wheel supporting device according to the invention will be described. FIG. 5 is a longitudinal sectional view showing a structure of a wheel supporting device 1. This wheel supporting device 1 supports a wheel at a driven side of an automobile or the like, and includes an axle 10 mounted on a vehicle body, a housing 20 to which the wheel is attached, and a rolling bearing 30 which supports the housing 20 so as to rotate with respect to the axle 10. It is to be noted that a side where the wheel is attached is called as an outer side, while an opposite side is called as an inner side.

The axle 10 has a large diameter part 11 at the inner side, and a small diameter part 12 at the outer side. The large diameter part 11 is fixed at the inner side to the vehicle body by means of a mounting part which is not shown. A pair of inner rings 31 which are components of the rolling bearing 30 are fitted over an outer periphery of the small diameter part

12. A threaded part 13 is formed on an outer side end of the small diameter part 12, and a nut 15 is spirally engaged with this threaded part 13 interposing a spacer 14. By spiraling engaging the nut 15, the inner rings 31 are clamped between the spacer 14 and an inner side end surface 16 which defines a boundary between the small diameter part 12 and the large diameter part 11, thereby to be fixed to an outer peripheral part 37 of the axle 10. It is to be noted that the stepped part is not formed between the small diameter part 12 and the large diameter part 11, unlike the first embodiment.

The housing 20 has a flange part 23 to which the wheel (not shown) is attached, at an outer side end of a shaft part 22 which is formed with a center bore 21. Hub bolts 24 for securing the wheel are provided in this flange part 23 at circumferentially equal intervals. Moreover, a braking mechanism (not shown) for applying a braking force against rotation of the housing 20 is arranged at an outer peripheral side of the shaft part 22.

An outer ring 32 which is a component of the rolling bearing 30 are fitted to an inner periphery of the center bore 21 of the housing 20. A groove 25 is formed on the inner periphery of the center bore 21 at the inner side, and a snap ring 26 is fitted into this groove 25. By fitting this snap ring 26, the outer ring 32 is clamped between an inner side end surface 27 of a stepped part which is formed in the center bore 21 and a spacer 28 in an annular shape which is inserted at the outer side of the snap ring 26 thereby to be fixed to the housing 20.

The rolling bearing 30 is a double row taper roller bearing, and has a pair of the inner rings 31 which are arranged at the outer side and at the inner side, the outer ring 32, taper rollers 33 in double rows, cages 34, and seal members 35, 36 which are arranged at the inner side and at the outer side. A pair of the inner rings 31 has respective raceway surfaces 31a, 31b for the taper rollers 33, on outer peripheral surfaces thereof. The outer ring 32 has raceway surfaces 32a, 32b at positions opposed to a pair of the raceway surfaces 31a, 31b. The taper rollers 33 are respectively arranged between the raceway surfaces 31a, 31b and the raceway surfaces 32a, 32b. The cages 34 are disposed in a space which is formed between the outer peripheral surfaces of the inner rings 31 and the inner peripheral surface of the outer ring 32, and hold the taper rollers 33 so as to rotate. The seal members 35, 36 which are formed of known pack seal or the like are interposed between both ends of the inner rings 31 and both ends of the outer ring 32. The seal members 35, 36 restrains muddy water or the like from entering into the roller bearing 30 through a gap between the inner rings 31 and the outer ring 32, and restrains lubricating grease sealed inside the rolling bearing 30 from scattering to the exterior.

Now, a sealing structure in an annular clearance X between an outer peripheral surface 17 of an end part at a vehicle body side in the axial direction of the inner ring of the rolling bearing and an inner peripheral surface 22a of the shaft part 22 of the housing 20 will be described. FIG. 6 is an enlarged sectional view of an essential part showing the sealing structure in the annular clearance X. This sealing structure includes a seal cover 41, a slinger 42, and a seal rubber 43.

The seal cover 41 is formed in a C-shape in cross section having a cylindrical part 41a, a flange part 41b, and a deflector part 41c. The cylindrical part 41a is fixed to the outer peripheral surface 17 of the axle 10 by press-fitting. The flange part 41b is formed in annular shape so as to extend outward in a radial direction from an inner side end of the cylindrical part 41a, and opposed to an end surface 22b of the shaft part 22 of the housing 20 in an axial direction interposing a small clearance. The deflector part 41c is formed in a cylindrical shape so as to extend in the axial direction from an outer peripheral edge of the flange part 41b, and opposed to an outer peripheral surface 22c of the shaft part 22 of the housing 20 interposing a small clearance.

The slinger 42 is formed in an L-shape in cross section having a cylindrical part 42a and a flange part 42b. The cylindrical part 42a is fixed to the inner peripheral surface 22a of the shaft part 22 of the housing 20 by press-fitting. The flange part 42b is formed so as to extend inward in a radial direction from an outer side end of the cylindrical part 42a, and opposed to the flange part 41b of the seal cover 41 in the axial direction.

The seal rubber 43 in an annular shape is disposed in the annular clearance X, and fixed to a corner part 38 between inner surfaces of the cylindrical part 41a and the flange part 41b of the seal cover 41 by vulcanized bonding. The seal rubber 43 has a recess 43a and a lip part 43b. The recess 43a is formed along an entire circumference on a surface of a cylindrical part of the seal rubber 43 which is opposed in the radial direction to a space S2 between the end surface 22b in the axial direction of the shaft part 22 of the housing 20 and the flange part 41b of the seal cover 41. The lip part 43b is formed so as to extend to the outer side and to an inner peripheral side, and a tip end of the lip part 43b is in sliding contact with the flange part 42b of the slinger 42.

Then, function of the sealing structure having the above described structure will be described. While the vehicle is running, muddy water or the like is splashed by the wheel and so on, and intrudes from the outer peripheral side of the housing 20 to the inner peripheral side. On this occasion, because a large overlapping amount A in the axial direction is secured between the deflector part 41c of the seal cover 41 and the outer peripheral surface 22c of the shaft part 22 of the housing 20, the muddy water or the like hardly intrudes into a space S1 between the outer peripheral surface 22c and the deflector part 41c. In case where the muddy water or the like has intruded into the space S1, the muddy water or the like must pass a long passage of small clearances such as the space S1 and the space S2, until it arrives at the annular clearance X, and hence, it is difficult for the muddy water or the like from the exterior to arrive at the annular clearance X.

Then, the muddy water or the like which has arrived at the annular clearance X through the space S2 is introduced to the recess 43a of the seal rubber 43 which is formed so as to be opposed to the space S2. Because this recess 43a is formed along the entire circumference of the seal rubber 43, the muddy water or the like introduced to the recess 43a is discharged by trough effect. Specifically, the muddy water or the like in the recess 43a flows downward along the recess 43a without staying there, and is discharged to the exterior through the space S2 and the space S1. Moreover, the muddy water or the like introduced to the recess 43a is hindered by a wall of the recess 43a at the outer side, and becomes difficult to move toward a space S3 which is formed at the outer peripheral side of the lip part 43b of the seal rubber 43. Further, because an overlapping amount B in the axial direction is secured between the inner peripheral surface 22a of the shaft part 22 of the housing 20 and the seal rubber 43, the muddy water or the like intruding through the space S2 inwardly in the radial direction becomes difficult to be introduced into the space S3 which is formed at the outer side.

In addition, because the lip part 43b of the seal rubber 43 is in sliding contact with the flange part 42b of the slinger 42, the muddy water or the like which intrudes to a side of the rolling bearing 30 from the space S3 can be substantially eliminated. Moreover, because the seal member 35 is disposed at the inner side end of the rolling bearing 30, intrusion of the muddy water or the like into the rolling bearing 30 is further restrained.

As described above, an amount of the muddy water introduced to the side of the rolling bearing 30 is sequentially decreased by respective constituent elements of the sealing structure and the seal member 35, it is possible to substantially eliminate the muddy water or the like which is introduced from the exterior of the vehicle into the rolling bearing 30. As the results, breakdown of the rolling bearing 30 by the intrusion of the muddy water or the like can be prevented.

In addition, the intrusion of the muddy water or the like from the outer side of the rolling bearing 30 is restrained by fitting an end cap 44 to a spigot joint part 29 which is formed at the outer side of the housing 20. Moreover, the intrusion of the muddy water or the like is further restrained by the seal member 36 which is arranged at the outer side end of the rolling bearing 30.

Therefore, according to the second embodiment, in addition to the advantages described in the first embodiment, the following advantages can be obtained.

(1) In the second embodiment, the cylindrical part 41a of the seal cover 41 is fixed to the outer peripheral surface 17 of the end part of the inner ring 31 of the rolling bearing 30 at the vehicle body side in the axial direction. In short, the seal cover 41 is an additive structure which belongs to the rolling bearing 30. Therefore, the seal cover 41 can be molded at the same time when the rolling bearing is produced. Moreover, when the seal cover 41 is attached to the axle 10, no particular step is required, but it is possible to attach the seal cover 41 at the same time, by mounting the rolling bearing 30 to the axle 10. As the results, steps for mounting the rolling bearing 30 can be decreased.

(2) Moreover, in the second embodiment, in case of employing the bearing of a type integrally including the housing 20 and the bearing 30, an entirety of the sealing structure of the wheel supporting device including the slinger 42 and the seal rubber 43 in addition to the seal cover 41 can be molded at the same time when the rolling bearing is produced. Moreover, when the sealing structure of the wheel supporting device is formed on the axle, no particular step is required, but it is possible to form the sealing structure of the wheel supporting device at the same time, by mounting the rolling bearing 30 on the axle 10. As the results, the steps can be further decreased.

The second embodiment may be modified as follows in the same manner as the first embodiment;

The sealing structure in the above described embodiment can be also applied to such a wheel supporting device that a magnetized member is attached to the end surface of the housing in the axial direction, and rotation speed of the housing can be detected by detecting magnetic poles of the magnetized member by means of a magnetic sensor. FIG. 7 is an enlarged sectional view of an essential part of a sealing structure of a wheel supporting device 2 which is constructed in this manner. It is to be noted that the same components as in the above described embodiment are denoted with the same reference numerals. The shaft part 22 of the housing 20 is provided with a pulsar ring S1 as the magnetized member. The pulsar ring 51 has a cylindrical part 51a which is fixed to the outer peripheral surface 22c of the shaft part 22 by press-fitting, and a magnetized part 51c in an annular shape which is arranged on the end surface 22b of the housing 20 in the axial direction and magnetized with multi-polarity in a circumferential direction. The sealing structure including the seal cover 41, the slinger 42, and the seal rubber 43 is constructed in the same manner as in the above described embodiment. The large diameter part 11 of the axle 10 is provided with a magnetic sensor 52 at the outer side, which detects the magnetic poles of the magnetized part 51c through a hole 41d which is formed in the flange part 41b of the seal cover 41. In the wheel supporting device 2 which is constructed in this manner, it is possible to employ the same sealing structure as in the wheel supporting device 1, and hence, the muddy water or the like can be restrained from intruding to the rolling bearing side.

Figure 8:
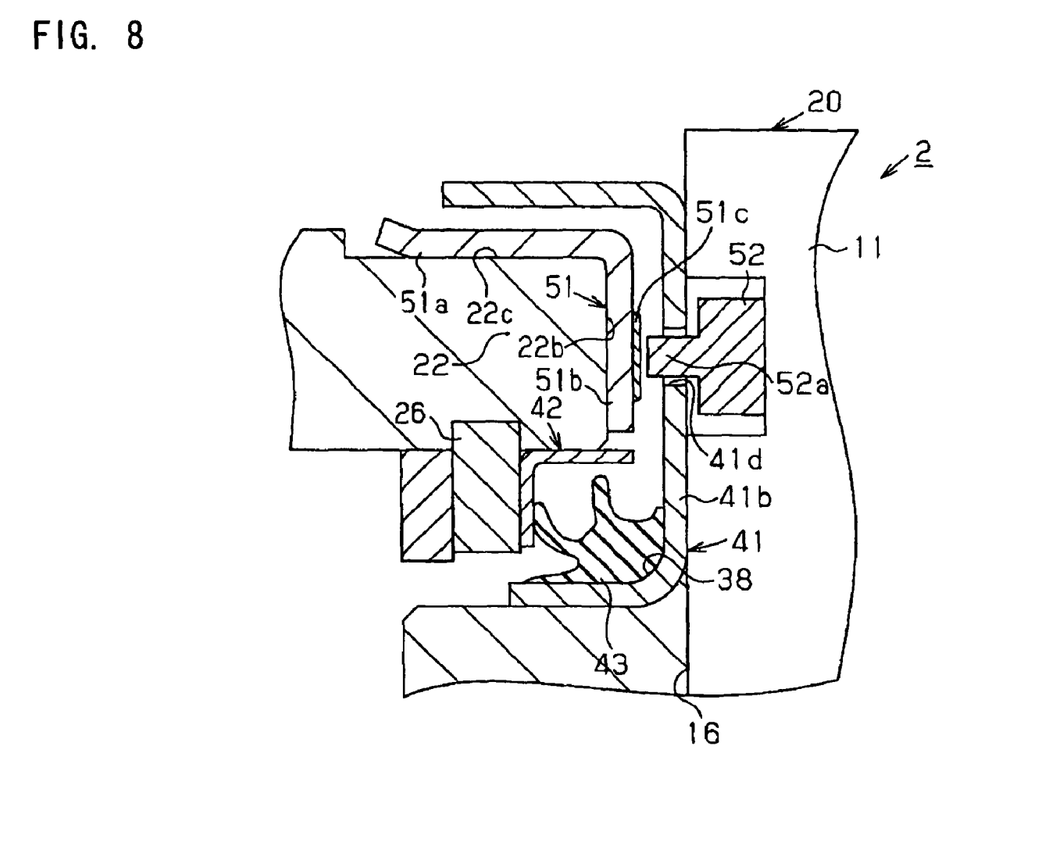
FIG. 8 is an enlarged sectional view showing a sealing structure of the wheel supporting device in still another example according to the second embodiment.

The sealing structure in the above described modified case can be further modified as follows. FIG. 8 is an enlarged sectional view of an essential part of a sealing structure of a wheel supporting device 2 which is constructed in this manner. It is to be noted that the same components as in the above described embodiment are denoted with the same reference numerals. The shaft part 22 of the housing 20 is provided with a pulsar ring 51 as the magnetized member. The pulsar ring 51 has a cylindrical part 51a which is fixed to the outer peripheral surface 22c of the shaft part 22 by press-fitting, a magnetized part supporting part 51b in an annular shape which is arranged on the end surface 22b of the shaft part 22 in the axial direction, and a magnetized part 51c in an annular shape which is attached to the magnetized part supporting part 51b and magnetized with multi-polarity in a circumferential direction. The magnetized part 51c is molded of rubber or synthetic resin into an annular shape, after magnetic powder such as ferrite has been mixed into the rubber or the synthetic resin, and magnetized with positive poles and negative poles alternately in a circumferential direction. The sealing structure including the seal cover 41, the slinger 42, and the seal rubber 43 is constructed in the same manner as in the above described embodiment. The large diameter part 11 of the axle 10 is provided with the magnetic sensor 52 at the outer side. A detecting part 52a of the magnetic sensor 52 is projected toward the magnetized part 51c through a hole 41d which is formed in the flange part 41b of the seal cover 41 and detects the magnetic poles of the magnetized part 51c. In the wheel supporting device 2 which is constructed in this manner, it is possible to employ the same sealing structure as in the wheel supporting device 1, and hence, the muddy water or the like can be restrained from intruding to the side of the rolling bearing. Moreover, according to this structure, because the detecting part 52a of the magnetic sensor 52 is positioned close to the magnetized part 51c, detecting sensitivity of the magnetic sensor 52 can be made lower, and hence, a compact or a low-price magnetic sensor can be used.

In the above described embodiment, the lip part 43b of the seal rubber 43 is so designed as to be in sliding contact with the flange part 42b of the slinger 42. However, the lip part 43a may be so designed as to be in sliding contact with the surface of the housing 20 or the snap ring 26 without providing the slinger 42. Alternatively, the seal rubber 43 may be provided with a plurality of lip parts which are in sliding contact with the slinger.

In the above described embodiment, the seal member 35 is arranged on the inner side end of the rolling bearing 30. However, the seal member 35 may be omitted, provided that intrusion of the muddy water or the like into the rolling bearing 30 can be sufficiently restrained by the above described sealing structure.

In the above described embodiment, the double row taper roller bearing is used as the rolling bearing 30. However, a double row angular ball bearing may be also used.

What is claimed is:

1. A sealing structure for a wheel supporting device that includes an axle mounted on a vehicle body and an annular housing which is rotatably supported by the axle through a rolling bearing and to which a wheel is attached, the sealing structure comprising:

a seal cover disposed in an annular clearance between an outer peripheral surface of the axle and an inner peripheral surface of the housing outside the rolling bearing in an axial direction, the seal cover including:

a cylindrical part which is fixed to the outer peripheral surface of the axle;

an annular flange part which is formed so as to extend outward in a radial direction from an end part of the cylindrical part in the axial direction and opposed to an end surface of the housing in the axial direction; and a cylindrical deflector part which is formed so as to extend in the axial direction from an outer peripheral edge of the flange part and opposed to an outer peripheral surface of the housing; and a seal rubber comprising an annular shape and fixed to a corner part between the cylindrical part and the flange part of the seal cover, the seal rubber including: a cylindrical part which is opposed in the radial direction to a space between the end surface of the housing in the axial direction and the flange part; and a recess formed on a surface of the cylindrical part of the seal rubber, an end of the recess opposite the flange part of the seal cover forming a gap between the seal rubber and the inner peripheral surface of the housing; and a slinger comprising a cylindrical part fixed to the inner peripheral surface of the housing which is opposed to the cylindrical part of the seal cover, and a flange part which is formed so as to extend inward in the radial direction from an end part of the cylindrical part in the axial direction and opposed to the flange part of the seal cover in the axial direction, wherein the seal rubber further includes a lip part which is in sliding contact with the flange part of the slinger; and another lip part at the end of the recess facing the inner peripheral surface of the housing.

2. The sealing structure according to claim 1, wherein the recess is formed along an entire circumference of the cylindrical part of the seal rubber.

3. The sealing structure according to claim 1, wherein the end of the recess opposite the flange part of the seal cover forms a gap between the seal rubber and the cylindrical part of the slinger.

4. The sealing structure according to claim 1, wherein the recess comprises a U-shaped recess.

5. The sealing structure according to claim 1, wherein a length of the cylindrical deflector part of the seal cover is greater than a length of the cylindrical part of the seal cover which is fixed to the outer peripheral surface of the axle.

6. The sealing structure according to claim 1, wherein the cylindrical deflector part forms a gap, extending in the axial direction, between the cylindrical deflector part and the outer peripheral surface of the housing.

7. The sealing structure according to claim 1, wherein the cylindrical deflector part forms a continuous gap, extending in the axial direction between the cylindrical deflector part and the outer peripheral surface of the housing, and extending in the radial direction between the flange part and the end surface of the housing.

8. A sealing structure for a wheel supporting device, the wheel supporting device including an axle mounted on a vehicle body, a housing in an annular shape to which a wheel is attached and a rolling bearing which includes a cylindrical inner ring and a cylindrical outer ring, the inner ring being fixed to an outer peripheral part of the axle and the outer ring being fixed to the housing, the sealing structure comprising:

a seal cover disposed in an annular clearance between an outer peripheral surface of an end part of the inner ring at a vehicle body side in an axial direction and an inner peripheral surface of the housing, the seal cover includes including:

a cylindrical part which is fixed to the outer peripheral surface of the inner ring;

an annular flange part which is formed so as to extend outward in a radial direction from an end part of the cylindrical part in the axial direction and opposed to an end surface of the housing in the axial direction; and a cylindrical deflector part which is formed so as to extend in the axial direction from an outer peripheral edge of the flange part and opposed to an outer peripheral surface of the housing; and a seal rubber comprising an annular shape and fixed to a corner part between the cylindrical part and the flange part of the seal cover, the seal rubber including:

a cylindrical part which is opposed in the radial direction to a space between the end surface of the housing in the axial direction and the flange part; and a recess formed on a surface of the cylindrical part of the seal rubber, an end of the recess opposite the flange part of the seal cover forming a gap between the seal rubber and the inner peripheral surface of the housing; and a slinger comprising a cylindrical part fixed to the inner peripheral surface of the housing which is opposed to the cylindrical part of the seal cover, and a flange part which is formed so as to extend inward in the radial direction from an end part of the cylindrical part in the axial direction and opposed to the flange part of the seal cover in the axial direction, and wherein the seal rubber further includes a lip part which is in sliding contact with the flange part of the slinger; and another lip part at the end of the recess facing the inner peripheral surface of the housing.

9. The sealing structure according to claim 8, wherein the recess is formed along an entire circumference of the cylindrical part of the seal rubber.

* * * * *